(12) United States Patent
Zhang et al.

(10) Patent No.: US 12,500,289 B1
(45) Date of Patent: Dec. 16, 2025

(54) HEAT EXCHANGE ASSEMBLY, BATTERY APPARATUS, ELECTRIC DEVICE, AND ENERGY STORAGE DEVICE

(71) Applicant: CONTEMPORARY AMPEREX TECHNOLOGY CO., LIMITED, Ningde (CN)

(72) Inventors: Ruitong Zhang, Ningde (CN); Tianyue Yuan, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/254,025

(22) Filed: Jun. 30, 2025

Related U.S. Application Data

(63) Continuation of application No. PCT/CN2024/114639, filed on Aug. 26, 2024.

(51) Int. Cl.
*H01M 10/6556* (2014.01)
*H01M 10/613* (2014.01)
*H01M 10/625* (2014.01)
*H01M 10/653* (2014.01)

(52) U.S. Cl.
CPC ..... *H01M 10/6556* (2015.04); *H01M 10/613* (2015.04); *H01M 10/653* (2015.04); *H01M 10/625* (2015.04)

(58) Field of Classification Search
CPC .......... H01M 10/6556; H01M 10/613; H01M 10/653; H01M 10/625
See application file for complete search history.

(56) References Cited

U.S. PATENT DOCUMENTS

| | | | |
|---|---|---|---|
| 10,263,301 B2 * | 4/2019 | Kenney | H01M 10/6556 |
| 2012/0018238 A1 * | 1/2012 | Mizoguchi | B60L 50/66 |
| | | | 180/68.5 |
| 2019/0044156 A1 | 2/2019 | Tanaka | |
| 2019/0157636 A1 * | 5/2019 | Miler | H01M 50/30 |
| 2019/0312320 A1 * | 10/2019 | Uchiyama | H01M 10/625 |
| 2020/0185796 A1 * | 6/2020 | Stenvall | H01M 10/647 |
| 2021/0104801 A1 * | 4/2021 | Chu | H01M 50/291 |
| 2021/0234212 A1 * | 7/2021 | Gaigg | H01M 50/271 |
| 2021/0249723 A1 * | 8/2021 | Zheng | H01M 50/184 |
| 2022/0059894 A1 * | 2/2022 | Stephens | B60K 1/04 |
| 2022/0059902 A1 * | 2/2022 | Jiang | H01M 10/625 |
| 2022/0311084 A1 * | 9/2022 | Li | H01M 10/613 |

FOREIGN PATENT DOCUMENTS

| | | | |
|---|---|---|---|
| CN | 106304759 A | * | 1/2017 |
| CN | 112262495 A | | 1/2021 |
| CN | 116404299 A | | 7/2023 |
| CN | 116614991 A | | 8/2023 |

OTHER PUBLICATIONS

International Search Report in the international application No. PCT/CN2024/114639, mailed on May 15, 2025. 6 pages with English translation.
Written Opinion of the International Search Authority in the international application No. PCT/CN2024/114639, mailed on May 15, 2025. 6 pages with English translation.
First Office Action of the Chinese application No. 202422074721.9, issued on May 19, 2025. 2 pages with English translation.

* cited by examiner

*Primary Examiner* — Muhammad S Siddiquee
(74) *Attorney, Agent, or Firm* — K&L Gates LLP

(57) ABSTRACT

Embodiments of the present disclosure provide a heat exchange assembly, a battery apparatus, an electric device, and an energy storage device. The battery apparatus includes a case assembly, a battery cell assembly, and a heat exchange assembly. The battery cell assembly is disposed within the case assembly. The heat exchange assembly is disposed within the case assembly. The heat exchange assembly includes at least two flexible members, where the at least two flexible members are stacked, and the at least two flexible members form a hot-pressed region and a flow channel region by hot pressing. The flow channel region is configured to circulate a heat exchange medium to exchange heat with the battery cell assembly; and the hot-pressed region includes a heat-sealed zone, and the at least two flexible members are interconnected within the heat-sealed zone.

18 Claims, 5 Drawing Sheets

HEAT EXCHANGE ASSEMBLY, BATTERY APPARATUS, ELECTRIC DEVICE, AND ENERGY STORAGE DEVICE

CROSS-REFERENCE TO RELATED APPLICATIONS

The present application is the continuation of PCT application PCT/CN2024/114639, filed on Aug. 26, 2024, which is incorporated herein by reference in its entirety.

TECHNICAL FIELD

The present disclosure relates to the field of battery technology, and in particular, to a heat exchange assembly, a battery apparatus, an electric device, and an energy storage device.

BACKGROUND

This section is intended to provide background or context for embodiments of the present disclosure. The description herein is not admitted to be prior art by inclusion in this section.

In a new energy vehicles equipped with a battery, the battery can provide all or part of the power. During use of the battery, battery cells within the battery generate heat. Excessive heat adversely affects the performance and service life of the battery. Therefore, how to implement effective heat dissipation for the battery cells of the battery has become an important research direction in this field.

SUMMARY

In view of this, embodiments of the present disclosure aim to provide a heat exchange assembly, a battery apparatus, an electric device, and an energy storage device, so as to address the technical issue of improving heat exchange effect.

To this end, a first aspect of the embodiments of the present disclosure provides a battery apparatus including:
a case assembly;
a battery cell assembly disposed within the case assembly; and
a heat exchange assembly disposed within the case assembly; where the heat exchange assembly includes at least two flexible members, the at least two flexible members are stacked, and the at least two flexible members form a hot-pressed region and a flow channel region by hot pressing;
where the flow channel region is configured to circulate a heat exchange medium to exchange heat with the battery cell assembly; and the hot-pressed region includes a heat-sealed zone, and the at least two flexible members are interconnected within the heat-sealed zone.

The battery apparatus provided in the embodiments of the present disclosure includes the case assembly, the battery cell assembly, and the heat exchange assembly. The battery cell assembly is disposed within the case assembly, and the case assembly protects the battery cell assembly. The heat exchange assembly is configured to exchange heat with the battery cell assembly. On one hand, the heat exchange assembly is made of flexible members. The flexible members are light in weight, contributing to reducing the weight of the battery apparatus, lowering production costs of the heat exchange assembly, and increasing the energy density of the battery apparatus. On the other hand, the flexible members are arranged as a flexible structure, allowing the heat exchange assembly to better fit to the case assembly and/or the battery cell assembly. This facilitates absorption of assembly tolerances of the heat exchange assembly, enhances the fit between the heat exchange assembly and the case assembly and/or the battery cell assembly without needing to use sealants or thermally conductive materials, and increases the effective heat exchange area between the heat exchange assembly and the case assembly and/or the battery cell assembly, thereby improving the heat exchange efficiency and effect of the heat exchange assembly. Additionally, the flexible members form the hot-pressed region and the flow channel region by hot pressing, and the flow channel region is configured to circulate the heat exchange medium. Such forming manner is simple.

In some embodiments, the hot-pressed region further includes a non-heat-sealed zone, and the non-heat-sealed zone and the heat exchange flow channel are respectively located on two sides of the heat-sealed zone.

The non-heat-sealed zone is arranged in the heat-sealed zone, and the non-heat-sealed zone and the heat exchange flow channel are respectively located on two sides of the heat-sealed zone, which helps to reduce the width of the heat-sealed zone, thereby mitigating an issue that excessively high temperature caused by an overly wide heat-sealed zone affects hot pressing quality and damages the flexible members. Additionally, the non-heat-sealed zone can serve as a stress-relief buffer zone when the flexible members are folded, mitigating damage to the heat-sealed zone caused by stress concentration.

In some embodiments, a width of the heat-sealed zone is 0.5 mm to 30 mm.

In this embodiment, the width of the heat-sealed zone is set to be 0.5 mm to 30 mm, which helps to improve the reliability of the flow channel region of the flexible members, and increases the coverage rate of the flow channel region, thereby enhancing the heat exchange efficiency of the heat exchange assembly while mitigating an issue that excessively high temperature caused by an overly wide heat-sealed zone affects hot pressing quality and damages the flexible members.

In some embodiments, the width of the heat-sealed zone is 2 mm to 3 mm.

In this embodiment, such design further mitigates an issue that excessively high temperature caused by an overly wide heat-sealed zone affects hot pressing quality and damages the flexible members.

In some embodiments, the non-heat-sealed zone includes an enclosed zone, and the flow channel region surrounds the enclosed zone.

In this embodiment, the flow channel region surrounds the enclosed zone, that is, the enclosed zone is formed between the flow channel regions, thereby controlling the width of the heat-sealed zone. In other words, arrangement of the enclosed zone enhances the reliability of the heat-sealed zone, and mitigates an issue that excessively high temperature caused by an overly wide heat-sealed zone affects hot pressing quality and damages the flexible members.

In some embodiments, the enclosed zone includes a first sub-region, the first sub-region extends along a first direction, and a dimension of the first sub-region in a second direction is D, where 1 mm≤D≤50 mm, and the first direction is perpendicular to the second direction.

When D≥1 mm, adjacent heat-sealed zones can be separated, preventing overlapping of heat-sealed zones which would otherwise result in a large hot pressing width of the zones, thereby addressing an issue that excessively high temperature caused by an overly wide heat-sealed zone affects hot pressing quality and damages the flexible members. When D≤50 mm, the spacing between adjacent flow channel regions can be controlled, thereby improving heat exchange efficiency and heat exchange effect. Therefore, when 1 mm≤D≤50 mm, an optimal balance between hot pressing quality and heat exchange efficiency can be achieved, making the heat exchange assembly more practical.

In some embodiments, the non-heat-sealed zone further includes a second sub-region, the second sub-region extends along the second direction, and a dimension of the second sub-region in the first direction is D, where 1 mm≤D≤50 mm.

When D≥1 mm, adjacent heat-sealed zones can be separated, preventing overlapping of heat-sealed zones which would otherwise result in a large hot pressing width of the zones, thereby addressing an issue that excessively high temperature caused by an overly wide heat-sealed zone affects hot pressing quality and damages the flexible members. When D≤50 mm, the spacing between adjacent flow channel regions can be controlled, thereby improving heat exchange efficiency and heat exchange effect. Therefore, when 1 mm≤D≤50 mm, an optimal balance between hot pressing quality and heat exchange efficiency can be achieved, making the heat exchange assembly more practical.

In some embodiments, at least part of the enclosed zone is provided with an arc-shaped region at an end along an extension direction.

In this embodiment, the arc-shaped region is provided at the end of the enclosed zone along the extension direction. On one hand, this mitigates the issue of overlapping heat-sealed zones at the end of the enclosed zone. On the other hand, this prevents the issue of stress concentration caused by existence of right angles at the end of the enclosed zone, thereby mitigating failure of the heat-sealed zone caused by stress concentration and improving hot pressing quality.

In some embodiments, a radius of the arc-shaped region is R, where 4 mm≤R≤30 mm.

When R≥4 mm, adjacent heat-sealed zones can be separated, preventing overlapping of heat-sealed zones which would otherwise result in a large hot pressing width of the zones, thereby addressing an issue that excessively high temperature caused by an overly wide heat-sealed zone affects hot pressing quality and damages the flexible members. This can also prevent stress concentration caused by existence of right angles at the end of the enclosed zone, thereby mitigating failure of the heat-sealed zone caused by stress concentration and improving hot pressing quality. When R≤30 mm, the spacing between adjacent flow channel regions can be controlled, thereby improving heat exchange efficiency and heat exchange effect. Therefore, when 4 mm≤R≤30 mm, an optimal balance between hot pressing quality and heat exchange efficiency can be achieved, making the heat exchange assembly more practical.

In some embodiments, 8 mm≤R≤20 mm.

When 8 mm≤R≤20 mm, hot pressing quality and heat exchange efficiency can be further improved, making the heat exchange assembly more practical.

In some embodiments, the enclosed zone includes a main body region and an arc-shaped region, the main body region extends along the first direction, the arc-shaped region is provided on at least one end of the main body region along the first direction, a dimension of the main body region in the second direction is D, and a radius of the arc-shaped region is R, where R≥D/2, and the first direction is perpendicular to the second direction.

In this embodiment, when R≥D/2, adjacent heat-sealed zones can be separated, preventing overlapping of heat-sealed zones which would otherwise result in a large hot pressing width of the zones, thereby addressing an issue that excessively high temperature caused by an overly wide heat-sealed zone affects hot pressing quality and damages the flexible members. This can also prevent stress concentration caused by existence of right angles at the end of the enclosed zone, thereby mitigating failure of the heat-sealed zone caused by stress concentration and improving hot pressing quality.

In some embodiments, the main body region is smoothly connected to the arc-shaped region.

The main body region being smoothly connected to the arc-shaped region means that there is a smooth transition via an arc between the main body region and the arc-shaped region, further mitigating failure of the heat-sealed zone caused by stress concentration and further improving hot pressing quality.

In some embodiments, a central angle corresponding to the arc-shaped region is greater than or equal to 180°.

The central angle corresponding to the arc-shaped region being greater than or equal to 180° means that a region corresponding to the arc-shaped region is greater than or equal to a semicircle, further mitigating the issue of stress concentration.

In some embodiments, the at least two flexible members are arranged as metal-plastic composite films.

In this embodiment, since the metal-plastic composite films have small thickness and light weight, and the flow channel region is formed between the at least two metal-plastic composite films, the heat exchange assembly is not affected by the extrusion process and does not require a large thickness, thereby reducing the overall thickness and weight of the heat exchange assembly. The heat exchange assembly does not react with the heat exchange medium flowing inside, so there is no risk of corrosion and leakage.

In some embodiments, the at least two flexible members are arranged as aluminum-plastic films.

The aluminum-plastic film has high barrier performance, as well as good cold stamping formability, puncture resistance, electrolyte stability, and electrical insulation.

In some embodiments, the flexible member is a layered structure, the flexible member includes a metal layer and a non-metal layer, and the metal layer and the non-metal layer are sequentially stacked.

In this embodiment, the flexible members with the sequentially stacked metal layer and non-metal layer have small thickness and light weight, and the flow channel region is formed between the at least two flexible members, so that the heat exchange assembly is not affected by the extrusion process and does not require a large thickness, thereby reducing the overall thickness and weight of the heat exchange assembly. Additionally, the heat exchange assembly does not react with the heat exchange medium flowing inside, so there is no risk of corrosion and leakage.

In some embodiments, the metal layer includes one or more of aluminum foil, copper foil, and steel foil.

This allows the flexible member to have sufficient structural strength and provide isolation.

In some embodiments, the non-metal layer includes one or more of polypropylene, polyvinyl chloride, and polyethylene.

This allows the flexible member to have a waterproof effect.

In some embodiments, the non-metal layer is a hot-melt layer.

Herein, the non-metal layer is arranged as a hot-melt layer, that is, made of a hot-melt material, facilitating composite formation of the non-metal layer and the metal layer through hot melting, resulting in simple forming and high production efficiency.

In some embodiments, the flexible member is a layered structure, the flexible member includes a corrosion-resistant layer, an isolation layer, and a waterproof layer arranged sequentially, and the waterproof layer is closer to the flow channel region than the corrosion-resistant layer.

In this embodiment, the flexible member is designed to include the corrosion-resistant layer, the isolation layer, and the waterproof layer arranged sequentially, with the waterproof layer closer to the flow channel region than the corrosion-resistant layer, thereby improving the reliability of the heat exchange assembly.

In some embodiments, a thickness of the isolation layer is 6.5 μm to 100 μm.

In this embodiment, the thickness of the isolation layer is set to be 6.5 μm to 100 μm, allowing the flexible member to have sufficient structural strength and flexibility.

In some embodiments, the thickness of the isolation layer is 6.5 μm to 15 μm.

In this embodiment, the thickness of the isolation layer is set to be 6.5 μm to 15 μm, further allowing the flexible member to have sufficient structural strength and flexibility.

In some embodiments, a thickness of the corrosion-resistant layer is 5 μm to 20 μm.

In this embodiment, the thickness of the corrosion-resistant layer is set to be 5 μm to 20 μm, improving the wear resistance and toughness of the flexible member.

In some embodiments, a thickness of the waterproof layer is 50 μm to 120 μm.

In this embodiment, the thickness of the waterproof layer is set to be 50 μm to 120 μm, allowing sufficient structural strength for the waterproof layer to improve waterproof performance, and facilitating hot-pressing connection of the flexible member through the waterproof layer.

In some embodiments, a thickness of the flexible member is 0.05 mm to 0.3 mm.

The thickness of the flexible member is set to be 0.05 mm to 0.3 mm, allowing sufficient structural strength for the heat exchange assembly made of the flexible member while maintaining a small overall thickness for the heat exchange assembly. This helps to reduce the overall volume and weight of the battery, thereby increasing the energy density of the battery.

In some embodiments, the thickness of the flexible member is 0.08 mm to 0.2 mm.

The thickness of the flexible member is set to be 0.08 mm to 0.2 mm, allowing sufficient structural strength for the heat exchange assembly made of the flexible member while further maintaining a small overall thickness for the heat exchange assembly. This further helps to reduce the overall volume and weight of the battery, thereby further increasing the energy density of the battery.

In some embodiments, an elastic modulus of the flexible member is 0.1 MPa to 10000 MPa.

In this embodiment, the elastic modulus of the flexible member is set to be 0.1 MPa to 10000 MPa, allowing sufficient structural strength for the flexible member to improve the reliability of the heat exchange assembly, as well as sufficient deformation capability to enhance the fit between the heat exchange assembly and the case assembly and/or the battery cell assembly. This increases the effective heat exchange area between the heat exchange assembly and the case assembly and/or the battery cell assembly, thereby improving the heat exchange efficiency and effect of the heat exchange assembly.

A second aspect of the embodiments of the present disclosure provides a heat exchange assembly. The heat exchange assembly is a heat exchange assembly of the battery apparatus described above, and the heat exchange assembly is configured to exchange heat with the battery cell assembly.

The heat exchange assembly provided in the embodiments of the present disclosure is configured to exchange heat with the battery cell assembly. On one hand, the heat exchange assembly is made of flexible members. The flexible members are light in weight, contributing to reducing the weight of the battery apparatus, lowering production costs of the heat exchange assembly, and increasing the energy density of the battery apparatus. On the other hand, the flexible members are arranged as a flexible structure, allowing the heat exchange assembly to better fit to the case assembly and/or the battery cell assembly. This facilitates absorption of assembly tolerances of the heat exchange assembly, enhances the fit between the heat exchange assembly and the case assembly and/or the battery cell assembly without needing to use sealants or thermally conductive materials, and increases the effective heat exchange area between the heat exchange assembly and the case assembly and/or the battery cell assembly, thereby improving the heat exchange efficiency and effect of the heat exchange assembly. Additionally, the flexible members form the hot-pressed region and the flow channel region by hot pressing, and the flow channel region is configured to circulate the heat exchange medium. Such forming manner is simple.

A third aspect of the embodiments of the present disclosure provides an electric device including the battery apparatus described above or the heat exchange assembly described above.

The battery apparatus of the electric device provided in the embodiments of the present disclosure includes a case assembly, a battery cell assembly, and a heat exchange assembly. The battery cell assembly is disposed within a first accommodating cavity of the case assembly, and the case assembly protects the battery cell assembly. The heat exchange assembly is configured to exchange heat with the battery cell assembly. On one hand, the heat exchange assembly is made of flexible members. The flexible members are light in weight, contributing to reducing the weight of the battery apparatus, lowering production costs of the heat exchange assembly, and increasing the energy density of the battery apparatus. On the other hand, the flexible members are arranged as a flexible structure, allowing the heat exchange assembly to better fit to the case assembly and/or the battery cell assembly. This facilitates absorption of assembly tolerances of the heat exchange assembly, enhances the fit between the heat exchange assembly and the case assembly and/or the battery cell assembly without needing to use sealants or thermally conductive materials, and increases the effective heat exchange area between the heat exchange assembly and the case assembly and/or the battery cell assembly, thereby improving the heat exchange efficiency and effect of the heat exchange assembly. Additionally, the flexible members form the hot-pressed region and the flow channel region by hot pressing, and the flow channel region is configured to circulate the heat exchange medium. Such forming manner is simple.

A fourth aspect of the embodiments of the present disclosure provides an energy storage device including the battery apparatus described above or the heat exchange assembly described above.

The battery apparatus of the energy storage device provided in the embodiments of the present disclosure includes a case assembly, a battery cell assembly, and a heat exchange assembly, where the battery cell assembly is disposed within a first accommodating cavity of the case assembly, and the case assembly protects the battery cell assembly. The heat exchange assembly is configured to exchange heat with the battery cell assembly. On one hand, the heat exchange assembly is made of flexible members. The flexible members are light in weight, contributing to reducing the weight of the battery apparatus, lowering production costs of the heat exchange assembly, and increasing the energy density of the battery apparatus. On the other hand, the flexible members are arranged as a flexible structure, allowing the heat exchange assembly to better fit to the case assembly and/or the battery cell assembly. This facilitates absorption of assembly tolerances of the heat exchange assembly, enhances the fit between the heat exchange assembly and the case assembly and/or the battery cell assembly without needing to use sealants or thermally conductive materials, and increases the effective heat exchange area between the heat exchange assembly and the case assembly and/or the battery cell assembly, thereby improving the heat exchange efficiency and effect of the heat exchange assembly. Additionally, the flexible members form the hot-pressed region and the flow channel region by hot pressing, and the flow channel region is configured to circulate the heat exchange medium. Such forming manner is simple.

DESCRIPTION OF REFERENCE SIGNS

Figure 1:
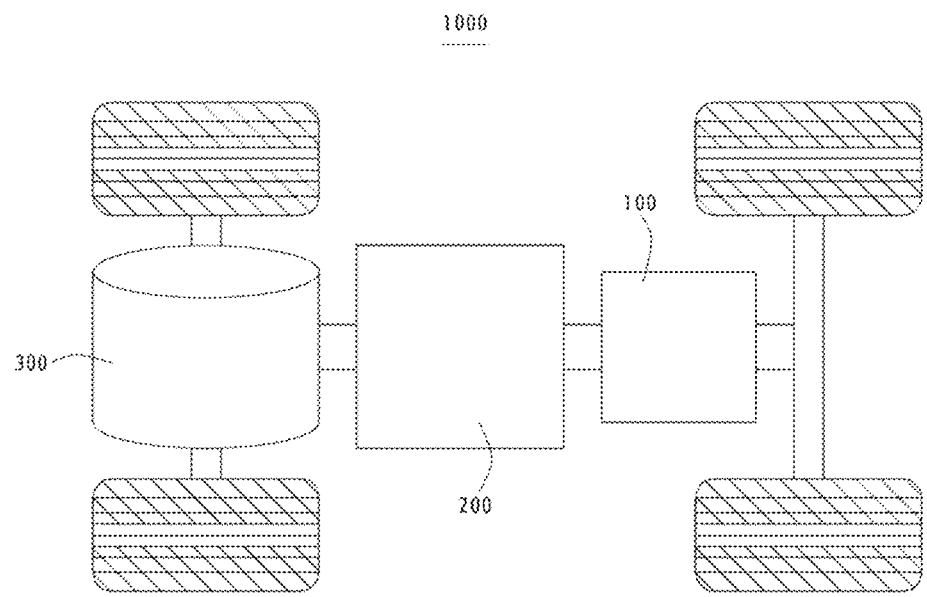
FIG. 1 is a schematic structural diagram of a vehicle according to an embodiment of the present disclosure.

10, battery cell assembly; 11, battery cell; 20, case assembly; 21, case body; 211, first case portion; 212, second case portion; 22, bottom guard plate; 221, connecting portion; 222, limiting structure; 23, first accommodating cavity; 24, second accommodating cavity; 30, heat exchange assembly; 31, flexible member; 32, flow channel region; 33, clearance hole; 34, heat-sealed zone; 35, inlet; 36, outlet; 37, non-heat-sealed zone; 38, enclosed zone; 381, first sub-region; 382, second sub-region; 383, main body region; 384, arc-shaped region; 39, open zone; 100, battery apparatus; 200, controller; 300, motor; and 1000, vehicle.

DESCRIPTION OF EMBODIMENTS

Unless otherwise specified, all embodiments and optional embodiments of the present disclosure can be combined with each other to form new technical solutions.

Unless otherwise specified, all technical features and optional technical features of the present disclosure can be combined with each other to form new technical solutions.

With the development of clean energy, an increasing number of devices use electrical energy as driving energy, leading to rapid development of power batteries capable of storing significant amounts of electrical energy and supporting a plurality of charge-discharge cycles, such as lithium-ion batteries. Power batteries are not only applied in energy storage power systems such as hydroelectric, thermal, wind, and solar power plants, but are also widely used in electric transportation vehicles such as electric bicycles, electric motorcycles, and electric vehicles, as well as in various fields such as aerospace.

In the embodiments of the present disclosure, a battery cell may be a secondary battery, where a secondary battery refers to a battery cell that can be recharged to activate active materials for continued use after discharge.

The battery cell may be a lithium-ion battery, a sodium-ion battery, a sodium-lithium-ion battery, a lithium metal battery, a sodium metal battery, a lithium-sulfur battery, a magnesium-ion battery, a nickel-hydrogen battery, a nickel-cadmium battery, a lead-acid battery, or the like, which is not limited in the embodiments of the present disclosure.

The battery cell typically includes an electrode assembly. The electrode assembly includes a positive electrode, a negative electrode, and a separator, where the separator is disposed between the negative electrode and the positive electrode. During charging and discharging of the battery cell, active ions (such as lithium ions) intercalate and deintercalate back and forth between the positive electrode and the negative electrode. The separator is disposed between the positive electrode and the negative electrode to prevent short-circuiting between the positive and negative electrodes while allowing active ions to pass through.

In some embodiments, the electrode assembly is a wound structure. The positive electrode plate and the negative electrode plate are wound into a wound structure.

In some embodiments, the electrode assembly is a stacked structure.

In an example, the positive electrode plate may be provided in plurality, the negative electrode plates may be provided in plurality, and the plurality of positive electrode plates and the plurality of negative electrode plates may be alternately stacked.

In an example, the positive electrode plate may be provided in plurality, and the negative electrode plate may be folded to form a plurality of stacked folding segments, with one positive electrode plate sandwiched between adjacent folding segments.

In an example, the positive electrode plate and the negative electrode plate each are folded to form a plurality of stacked folding segments.

In an example, the separator may be provided in plurality, each being disposed between any adjacent positive electrode plates or negative electrode plates.

In an example, a separator may be continuously arranged, disposed between any adjacent positive electrode plates or negative electrode plates by folding or winding.

In some embodiments, a shape of the electrode assembly may be cylindrical, flat, prismatic, or the like.

In some embodiments, the electrode assembly is provided with tabs, and the tabs can conduct current from the electrode assembly. The tabs include a positive tab and a negative tab.

In some embodiments, the battery cell may include a housing. The housing may be a steel housing, an aluminum housing, a plastic housing (for example, polypropylene), a composite metal housing (for example, a copper-aluminum composite housing), an aluminum-plastic film, or the like. In some embodiments, the housing may be a sealed structure or a non-sealed structure. In an example, in a case that the housing is a non-sealed structure, the housing serves to protect the electrode assembly, and a sealing bag is further included between the housing and the electrode assembly, where the sealing bag is configured to package the electrode assembly and an electrolyte. Specifically, the sealing bag may be a bag-shaped insulator or an aluminum-plastic film. In a case that the housing is a sealed structure, it is configured to package components such as the electrode assembly and the electrolyte.

In an example, the battery cell may be a cylindrical battery cell, a prismatic battery cell, a pouch battery cell, or a battery cell of other shapes. The prismatic battery cell includes a square-shell battery cell, a blade-shaped battery cell, or a multi-prismatic battery. The multi-prismatic battery may be, for example, a hexagonal prismatic battery, which is not particularly limited in the present disclosure.

In some embodiments, the housing includes an end cover and a shell, where the shell is provided with an opening, and the end cover covers the opening. The shell may be provided with one or more openings. One or more end covers may be provided.

In some embodiments, the housing is provided with at least one electrode terminal, where the electrode terminal is electrically connected to a tab. The electrode terminal may be directly connected to the tab, or may be indirectly connected to the tab via a current collector. The electrode terminal may be disposed on the end cover or on the shell.

In some embodiments, the energy storage device includes an energy storage container, an energy storage cabinet, or the like.

Power plants have an increasingly high requirement on area energy density of energy storage containers. Therefore, to increase power capacity, the weight of the containers also increases correspondingly. However, containers need to be transported from the production site to the usage site by land transportation and/or sea transportation. Usually, there are weight limits for land transportation and sea transportation, creating a conflict between the improvement of the energy density and the weight of the energy storage container.

During use of the battery apparatus, battery cells within the battery apparatus generate heat. Excessive heat adversely affects the performance and service life of the battery apparatus. Therefore, how to implement effective heat dissipation for the battery cells of the battery apparatus has become an important research direction in the field. In related technologies, a cooling system is disposed within a battery apparatus case to cool battery cells in a battery apparatus. The cooling system may include a plurality of aluminum water-cooling plates arranged within the battery apparatus case, with surfaces of the plurality of water-cooling plates in contact with surfaces of the battery cells in the battery apparatus. During the use process, a heat exchange medium, such as water, flows through the plurality of water-cooling plates, thereby dissipating heat from the battery cells and cooling the battery cells. However, when the aluminum water-cooling plates in the cooling system do not fit well to the surfaces of the battery cells in the battery apparatus, heat exchange efficiency and effect are suboptimal. Additionally, during assembly with the battery cell assembly, assembly tolerance compensation is required, involving the use of a sealant, which results in high production costs. Furthermore, the water-cooling plates and the battery apparatus case have high rigidity, requiring the use of a rigid structural adhesive, which makes disassembly difficult. If a non-drying adhesive, a soft adhesive, or a double-sided tape is used, the water-cooling plates and the battery apparatus case have good rigidity, but adhesive detachment issues may exist when there are gaps or flatness mismatches.

In view of this, to improve the heat exchange efficiency and effect of heat exchange assemblies, embodiments of the present disclosure provide a battery apparatus. The battery apparatus includes a case assembly, a battery cell assembly, and a heat exchange assembly. The battery cell assembly is disposed within the case assembly. The heat exchange assembly is disposed within the case assembly. The heat exchange assembly includes at least two flexible members, and the at least two flexible members are stacked. The at least two flexible members include a heat-sealed zone, where the heat-sealed zone is formed by hot pressing the at least two flexible members. The heat-sealed zone divides the heat exchange assembly to form a flow channel region and a non-heat-sealed zone, where the flow channel region is configured to circulate a heat exchange medium, and the heat exchange medium is configured to exchange heat with the battery cell assembly.

The battery apparatus provided in the embodiments of the present disclosure includes the case assembly, the battery cell assembly, and the heat exchange assembly. The battery cell assembly is disposed within the case assembly, and the case assembly protects the battery cell assembly. The heat exchange assembly is configured to exchange heat with the battery cell assembly. On one hand, the heat exchange assembly is made of flexible members. The flexible members are light in weight, contributing to reducing the weight of the battery apparatus, lowering production costs of the heat exchange assembly, and increasing the energy density of the battery apparatus. On the other hand, the flexible members are arranged as a flexible structure. The flexible structure has a certain deformation capability, allowing the heat exchange assembly to better fit and adapt to the case assembly and/or the battery cell assembly. This facilitates absorption of assembly tolerances of the heat exchange assembly, enhances the fit between the heat exchange assembly and the case assembly and/or the battery cell assembly, and increases the effective heat exchange area between the heat exchange assembly and the case assembly and/or the battery cell assembly, thereby improving the heat exchange efficiency and effect of the heat exchange assembly.

Additionally, the flexible members are sealed by a hot pressing process, that is, the heat-sealed zone is formed by hot pressing, and the heat-sealed zone divides the heat exchange assembly to form the flow channel region and the non-heat-sealed zone. This forming manner is simple. Additionally, arrangement of the non-heat-sealed zone helps reduce the width of the heat-sealed zone, mitigating an issue that excessively high temperature caused by an overly wide heat-sealed zone affects hot pressing quality and damages the flexible members. Additionally, the non-heat-sealed zone can serve as a stress-relief buffer zone when the flexible members are folded, mitigating damage to the heat-sealed zone caused by stress concentration.

The technical solutions described in the embodiments of the present disclosure are applicable to electric devices using a battery apparatus. The electric device includes the battery apparatus according to any embodiment of the present disclosure, where the battery apparatus is configured to provide electrical energy.

The electric device may be a vehicle, a mobile phone, a portable device, a notebook computer, a ship, a spacecraft, an electric toy, an electric tool, or the like. The vehicle may be a fuel vehicle, a gas vehicle, or a new energy vehicle, where the new energy vehicle may be a pure electric vehicle, a hybrid vehicle, or an extended-range vehicle; the spacecraft includes an airplane, a rocket, a space shuttle, a spaceship, or the like; the electric toy includes a fixed or mobile electric toy, such as a gaming console, an electric car toy, an electric ship toy, an electric airplane toy, or the like; the electric tool includes a metal cutting electric tool, a grinding electric tool, an assembly electric tool, and a railway electric tool, such as an electric drill, an electric grinder, an electric wrench, an electric screwdriver, an electric hammer, an impact drill, a concrete vibrator, an electric planer, or the like. The embodiments of the present disclosure impose no particular limitations on the foregoing electric device.

It should be noted that the technical solutions described in the embodiments of the present disclosure are not limited to the battery apparatus and electric device described above, but are also applicable to all battery apparatuses including a case assembly and electric devices using a battery apparatus. For brevity of description, the following embodiments are described with an electric vehicle as an example.

Referring to FIG. 1, a controller 200, a motor 300, and a battery apparatus 100 may be disposed inside a vehicle 1000. The controller 200 is configured to control the battery apparatus 100 to supply power to the motor 300. For example, the battery apparatus 100 may be disposed at the bottom, front, or rear of the vehicle 1000. The battery apparatus 100 may be configured to supply power to the vehicle 1000. For example, the battery apparatus 100 may be used in a circuit system of the vehicle 1000 as an operational power source for the vehicle 1000, for example, to satisfy power needs of start, navigation, and driving of the vehicle 1000. In another embodiment of the present disclosure, the battery apparatus 100 may not only serve as an operational power source for the vehicle 1000 but also as a driving power source for the vehicle 1000, replacing or partially replacing fuel or natural gas to provide driving power for the vehicle 1000.

Figure 2:
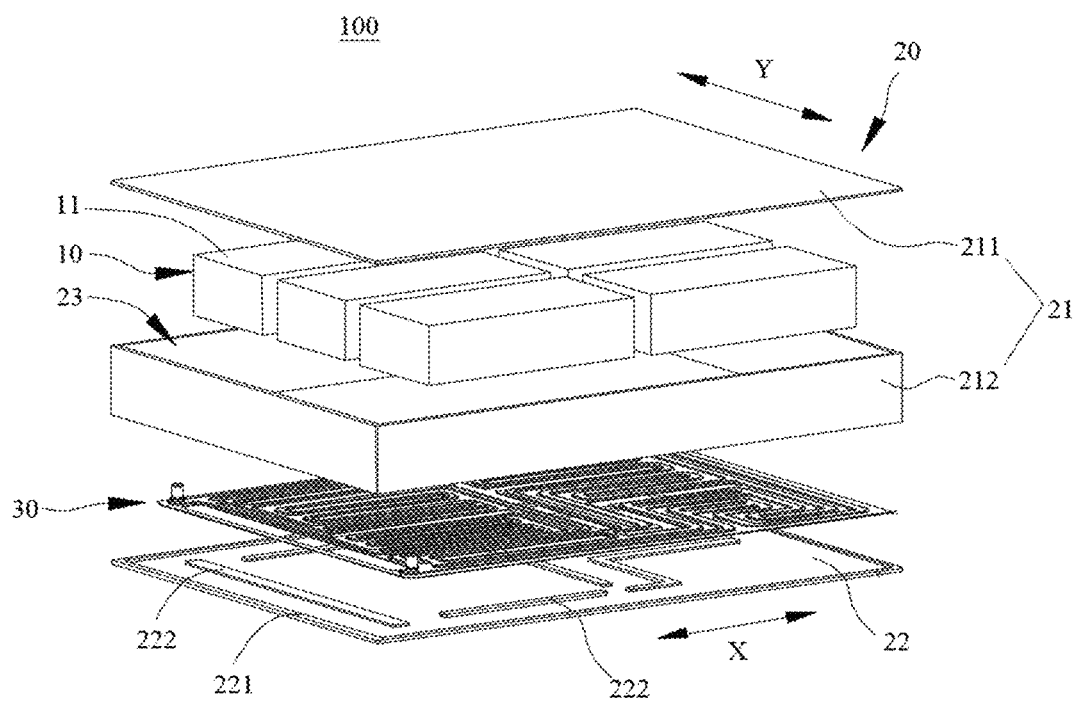
FIG. 2 is a schematic exploded perspective view of a battery apparatus according to an embodiment of the present disclosure, where a heat exchange assembly is disposed within a second accommodating cavity.

Referring to FIG. 2, to meet different power usage demands, the battery apparatus 100 includes a battery cell assembly 10, where the battery cell assembly 10 may include a plurality of battery cells 11, and a battery cell 11 refers to the smallest unit constituting a module or pack of the battery apparatus 100. The plurality of battery cells 11 may be connected in series, parallel, or series-parallel, where being connected in series-parallel refers to a combination of series and parallel connections of the plurality of battery cells 11. The plurality of battery cells 11 may be directly connected in series, parallel, or series-parallel, and the entirety formed by the plurality of battery cells 11 is accommodated within a case assembly 20. Certainly, the battery apparatus 100 may alternatively be formed by a plurality of battery cells 11 being connected in series, parallel, or series-parallel first to form a battery apparatus 100 module and then a plurality of battery apparatus 100 modules being connected in series, parallel, or series-parallel to form an entirety which is accommodated within the case assembly 20. The battery apparatus 100 may further include other structures. For example, the battery apparatus 100 may further include a busbar component for implement electrical connections among the plurality of battery cells 11. Each battery cell 11 may be a secondary battery apparatus 100 or a primary battery apparatus 100, or may be a lithium-sulfur battery apparatus 100, a sodium-ion battery apparatus 100, or a magnesium-ion battery apparatus 100, without limitation thereto. The battery cell 11 may be cylindrical, flat, cuboidal, or other shapes.

Figure 3:
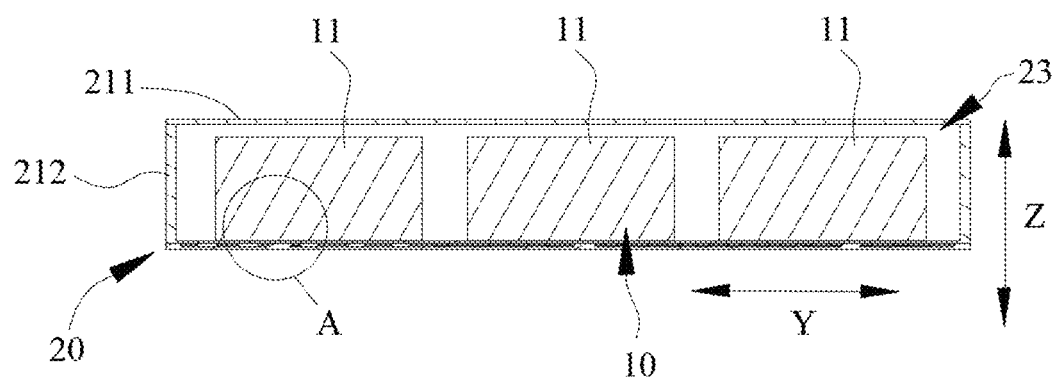
FIG. 3 is a cross-sectional view of a battery apparatus according to an embodiment of the present disclosure.
Figure 4:
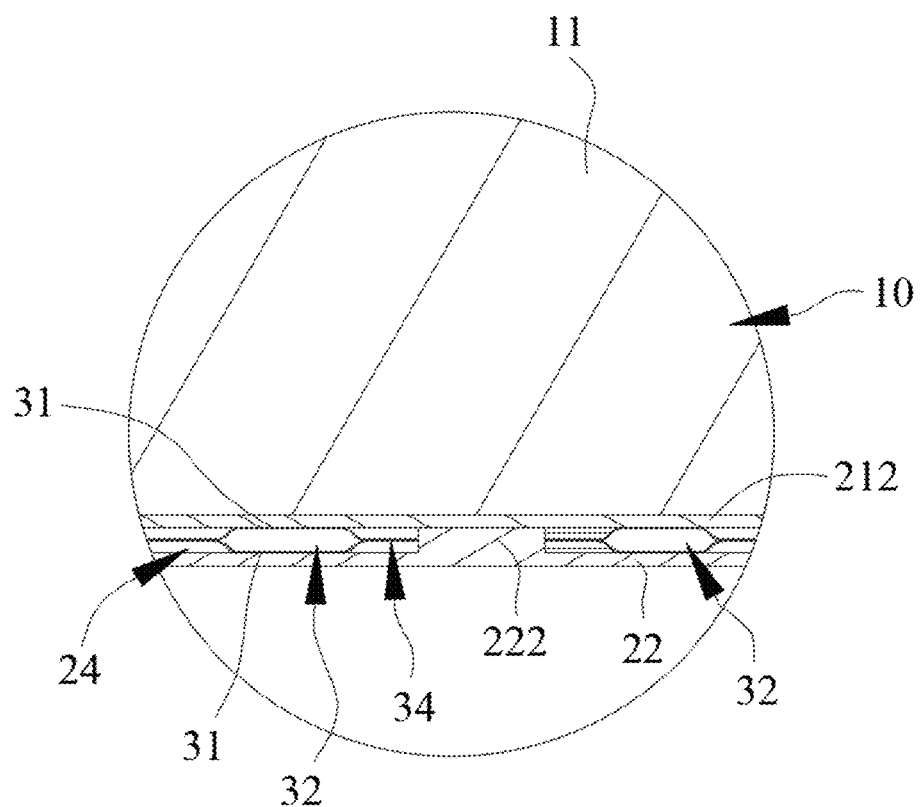
FIG. 4 is an enlarged view of position A in FIG. 3.
Figure 5:
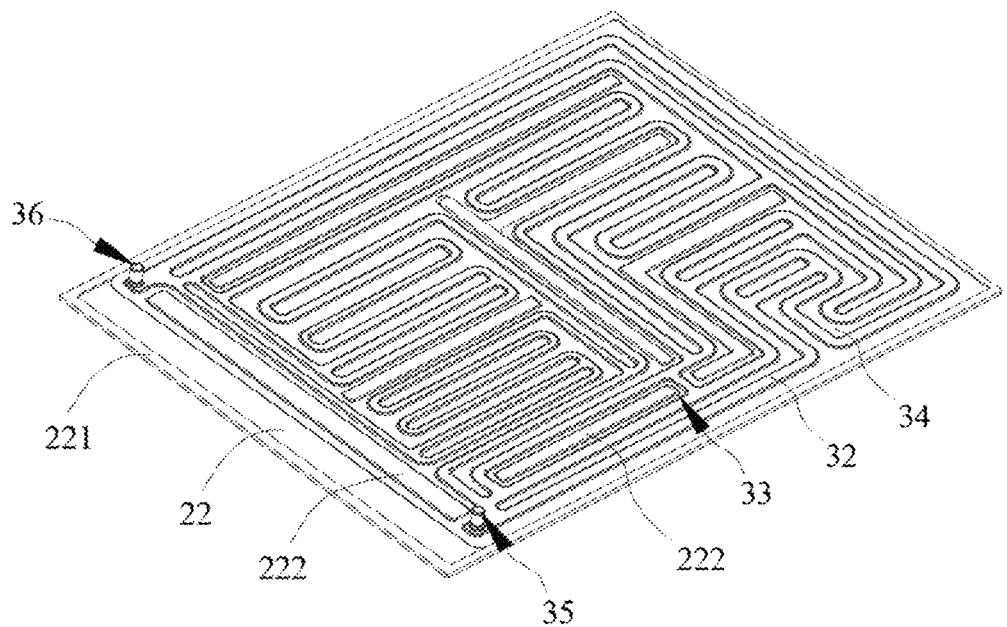
FIG. 5 is a schematic diagram of a connection structure between a heat exchange assembly and a bottom guard plate according to an embodiment of the present disclosure.
Figure 6:
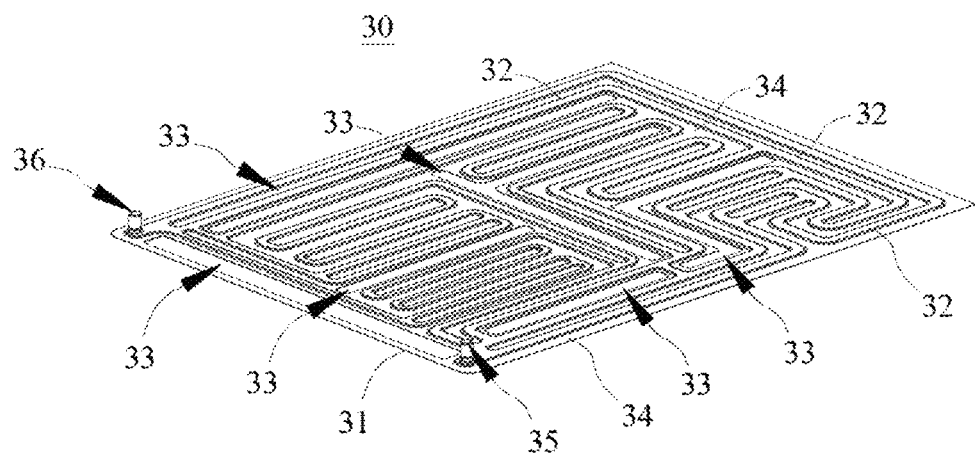
FIG. 6 is a schematic structural diagram of a heat exchange assembly according to an embodiment of the present disclosure.
Figure 7:
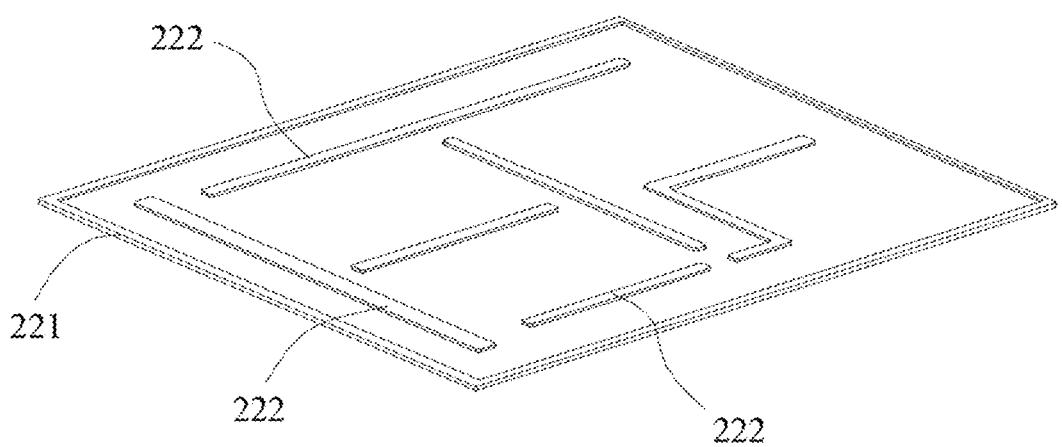
FIG. 7 is a schematic structural diagram of a bottom guard plate according to an embodiment of the present disclosure.

Referring to FIGS. 2 to 4, an embodiment of the present disclosure provides a battery apparatus 100. The battery apparatus 100 includes a case assembly 20, a battery cell assembly 10, and a heat exchange assembly 30. The battery cell assembly 10 is disposed within the case assembly 20. The heat exchange assembly 30 is disposed within the case assembly 20. The heat exchange assembly 30 includes at least two flexible members 31, where the at least two flexible members 31 are stacked. Referring to FIG. 3, the at least two flexible members 31 form a hot-pressed region and a flow channel region 32 by hot pressing. The flow channel region 32 is configured to circulate a heat exchange medium to exchange heat with the battery cell assembly 10. The hot-pressed region includes a heat-sealed zone 34, where the at least two flexible members 31 are interconnected within the heat-sealed zone 34.

Referring to FIG. 2, the battery apparatus 100 includes a case assembly 20 and a battery cell assembly 10, where the battery cell assembly 10 includes at least one battery cell 11, and the battery cell 11 is disposed within a first accommodating cavity 23 of the case assembly 20.

The case assembly 20 may be a simple three-dimensional structure such as a separate cuboid, cylinder, or sphere, or a complex three-dimensional structure formed by combining simple three-dimensional structures such as cuboids, cylinders, or spheres. A material of the case assembly 20 may be an alloy material such as aluminum alloy or iron alloy, or a polymer material such as polycarbonate or polyisocyanurate foam, or a composite material such as glass fiber reinforced epoxy resin.

The case assembly 20 is configured to package the battery cell assembly 10. The case assembly 20 can prevent liquids or other foreign objects from affecting the charging or discharging of the battery cell assembly 10.

Referring to FIGS. 2 to 9, an embodiment of the present disclosure provides a heat exchange assembly 30, where the heat exchange assembly 30 is a heat exchange assembly 30 of the battery apparatus 100 provided in the embodiments of the present disclosure, and the heat exchange assembly 30 is configured to exchange heat with the battery cell assembly 10.

Herein, the heat exchange assembly 30 may be disposed within the first accommodating cavity 23 of the case assembly 20, that is, may be in direct contact with the battery cell assembly 10; or may be disposed outside the first accommodating cavity 23 to transfer heat through an intermediate medium, thereby implementing heat exchange between the heat exchange assembly 30 and the battery cell assembly 10.

Herein, the heat exchange assembly 30 being disposed within the case assembly 20 means that the heat exchange assembly 30 may be disposed within the first accommodating cavity 23, that is, may be in direct contact with the battery cell assembly 10 to improve heat exchange efficiency, or may be disposed outside the first accommodating cavity 23 to transfer heat through an intermediate medium, thereby implementing heat exchange between the heat exchange assembly 30 and the battery cell assembly 10.

The heat exchange assembly 30 including at least two flexible members 31 means that the number of flexible members 31 included in the heat exchange assembly 30 may be two or more than two.

Herein, "flexible" in the flexible member 31 refers to a material property of the structure. This type of property may be imparted by the lightweight nature of the material, or may be imparted by at least any one nature of the material such as thickness, stiffness, strength, or elastic modulus. In an example, a material of the flexible member 31 may be a material lighter than conventional structures such as aluminum plates or steel plates, and its flexibility can be controlled by the thickness, width, length, and material type of the flexible member 31. In the embodiments of the present disclosure, the heat exchange assembly 30 is configured in the form of flexible members 31, reducing the weight of the heat exchange assembly 30.

In some embodiments, the at least two flexible members 31 form a hot-pressed region and a flow channel region 32 by hot pressing, where the hot-pressed region further includes a non-heat-sealed zone 37, and the non-heat-sealed zone 37 and the heat exchange flow channel 32 are respectively located on two sides of the heat-sealed zone 34.

The at least two flexible members 31 include a heat-sealed zone 34, where the heat-sealed zone 34 is formed by hot pressing the at least two flexible members 31, and the heat-sealed zone 34 divides the heat exchange assembly 30 to form the flow channel region 32 and the non-heat-sealed zone 37, meaning that the flexible members 31 are hot pressed to form the flow channel region 32 and the non-heat-sealed zone 37, that is, the heat-sealed zone 34 separates the flow channel region 32 from the non-heat-sealed zone 37.

The heat exchange medium circulates within the flow channel region 32 to implement heat exchange with the battery cell assembly 10.

It should be noted that the heat exchange medium is not limited to a specific type herein, as long as it can provide a cooling effect for the battery cell 11, such as being gaseous or liquid. In the embodiments of the present disclosure, the heat exchange medium being a coolant is used as an example for illustration.

For example, the heat exchange assembly 30 further includes an inlet 35 and an outlet 36, where both the inlet 35 and the outlet 36 are in communication with the flow channel region 32.

Herein, the inlet 35 and the outlet 36 of the heat exchange assembly 30 are configured to be connected to pipelines of a vehicle or an electric device's air conditioning system, water tank, or other liquid storage devices.

It should be noted that a specific number of flow channel regions 32 is not limited herein. One or more flow channel regions 32 may be provided.

The term "a plurality" in the embodiments of the present disclosure refers to a quantity of two or more.

The principle of the heat exchange assembly 30 exchanging heat with the battery cell assembly 10 is as follows: A heat exchange medium output from a heat exchange medium source (not shown in the figure) enters the flow channel region via the inlet 35 of the heat exchange assembly 30. After the heat exchange medium exchanges heat with the battery cell assembly 10, the heat exchange medium flows out via the outlet 36 of the heat exchange assembly 30, completing the heat exchange with the battery cell assembly 10.

Herein, the heat exchange assembly 30 exchanging heat with the battery cell assembly 10 may be: dissipating heat from the battery cell assembly 10 or heating the battery cell assembly 10.

The principle of the heat exchange assembly 30 dissipating heat from the battery cell assembly 10 is as follows: The heat exchange medium output from the heat exchange medium source enters the flow channel region via the inlet 35 of the heat exchange assembly 30. After the heat exchange medium absorbs heat generated during operation of the battery cell assembly 10, the heat exchange medium flows out via the outlet 36 of the heat exchange assembly 30 to release the heat, thereby completing the cooling and heat dissipation of the battery cell assembly 10.

The principle of the heat exchange assembly 30 heating the battery cell assembly 10 is as follows: The heat exchange medium output from the heat exchange medium source enters the flow channel region via the inlet 35 of the heat exchange assembly 30. After the heat exchange medium transfers heat to the battery cell assembly 10 to heat the battery cell assembly 10, the heat exchange medium flows out via the outlet 36 of the heat exchange assembly 30, completing the heating of the battery cell assembly 10.

The flexible members 31 are arranged as a flexible structure, where the flexible member 31 has a certain expandability or contractibility. This may also be understood as follows: the flexible member 31 may be an elastically deformable structure, and the flexible member 31 has the ability to deform and recover from deformation. Therefore, the heat exchange assembly 30 can be formed as a conformal structure, allowing the heat exchange assembly 30 to better adapt to an external contour shape of the battery cell or other components, thereby enhancing the fit between the heat exchange assembly 30 and the case assembly 20 and/or the battery cell assembly 10. This increases the effective heat exchange area between the heat exchange assembly 30 and the case assembly 20 and/or the battery cell assembly 10, thereby improving the heat exchange efficiency.

It should be noted that the flexible member 31 may have conductive performance, which facilitates maintaining equipotential with the case assembly 20. The flexible member 31 may also have electrical insulation properties, with no need for insulation treatment, thereby reducing the risk of electrical leakage and production costs of the battery apparatus 100, and improving the reliability of the battery apparatus 100.

The battery apparatus provided in the embodiments of the present disclosure includes the case assembly 20, the battery cell assembly 10, and the heat exchange assembly 30. The battery cell assembly 10 is disposed within the case assembly 20, and the case assembly 20 protects the battery cell assembly 10. The heat exchange assembly 30 is configured to exchange heat with the battery cell assembly 10. On one hand, the heat exchange assembly 30 is made of flexible members 31. The flexible members 31 are light in weight, contributing to reducing the weight of the battery apparatus 100, lowering production costs of the heat exchange assembly 30, and increasing the energy density of the battery apparatus 100. On the other hand, the flexible members 31 are arranged as a flexible structure. The flexible structure has a certain deformation capability, allowing the heat exchange assembly 30 to better fit and adapt to the case assembly 20 and/or the battery cell assembly 10. This facilitates absorption of assembly tolerances of the heat exchange assembly 30, enhances the fit between the heat exchange assembly 30 and the case assembly 20 and/or the battery cell assembly 10, and increases the effective heat exchange area between the heat exchange assembly 30 and the case assembly 20 and/or the battery cell assembly 10, thereby improving the heat exchange efficiency and effect of the heat exchange assembly 30.

Additionally, the flexible members 31 form the hot-pressed region and the flow channel region 32 by hot pressing, and the flow channel region 32 is configured to circulate the heat exchange medium. This forming manner is simple. The non-heat-sealed zone 37 is provided in the heat-sealed zone, and the non-heat-sealed zone 37 and the heat exchange flow channel 32 are respectively located on two sides of the heat-sealed zone 34. This helps reduce the width of the heat-sealed zone 34, mitigating an issue that excessively high temperature caused by an overly wide heat-sealed zone 34 affects hot pressing quality and damages the flexible members 31. Additionally, the non-heat-sealed zone 37 can serve as a stress-relief buffer zone when the flexible members 31 are folded, mitigating damage to the heat-sealed zone 34 caused by stress concentration.

Herein, the heat exchange assembly 30 may be disposed within the first accommodating cavity 23, that is, the heat exchange assembly 30 can be in direct contact with the battery cell assembly 10, thereby further improving the heat exchange efficiency between the heat exchange assembly 30 and the battery cell assembly 10.

Certainly, in other embodiments, referring to FIG. 2, the heat exchange assembly 30 may be disposed outside the first accommodating cavity 23.

In other words, at least part of the heat exchange assembly 30 is disposed outside the first accommodating cavity 23 to separate the heat exchange assembly 30 from the battery cell assembly 10.

In related technologies, the heat exchange assembly and the battery cell assembly are disposed in the same space, ensuring the heat exchange efficiency. However, when the battery cell assembly is in an extremely abnormal condition, the heat exchange medium in the cooling system may leak, and the leaked heat exchange medium increases the risk of short circuits in the battery cell assembly within the battery apparatus case to some extent, affecting the reliability of the battery apparatus.

In this embodiment, the heat exchange assembly 30 is disposed outside the first accommodating cavity 23, separating the heat exchange assembly 30 from the battery cell assembly 10. This reduces the risk of the heat exchange medium of the heat exchange assembly 30 contacting the battery cell assembly 10 after leakage is reduced, thereby reducing the risk of short-circuiting the battery apparatus 100 and improving the reliability of the battery apparatus 100.

The case assembly 20 is configured to accommodate the battery cell assembly 10. The case assembly 20 may be of various structures. In some embodiments, referring again to FIG. 2, the case assembly 20 includes a case body 21. The case body 21 may include a first case portion 211 and a second case portion 212, the first case portion 211 and the second case portion 212 are engaged with each other, and the first case portion 211 and the second case portion 212 together define the first accommodating cavity 23 for accommodating the battery cell assembly 10. The second case portion 212 may be a hollow structure with an opening on one side, and the first case portion 211 may be a plate-shaped structure, where the first case portion 211 covers the opening side of the second case portion 212 to form the case body 21 having the first accommodating cavity 23. Alternatively, the first case portion 211 and the second case portion 212 may each be a hollow structure with an opening on one side, where the opening side of the first case portion 211 covers the opening side of the second case portion 212 to form the case body 21 having the first accommodating cavity 23. Certainly, the first case portion 211 and the second case portion 212 may be of various shapes, such as cylindrical, cuboidal, or the like.

To improve sealing performance after the first case portion 211 and the second case portion 212 are connected, a sealing member, such as a sealant or a sealing ring, may further be disposed between the first case portion 211 and the second case portion 212.

Assuming the first case portion 211 covers the top of the second case portion 212, the first case portion 211 may also be referred to as an upper case cover, and the second case portion 212 may also be referred to as a lower case cover.

In some other embodiments, referring again to FIG. 2, the case assembly 20 may alternatively be designed to include a case body 21 and a bottom guard plate 22 as needed. A second accommodating cavity 24 is formed between the bottom guard plate 22 and an outer side wall of the case body 21. The heat exchange assembly 30 is disposed within the second accommodating cavity 24.

It should be noted that the bottom guard plate 22 may be disposed at the bottom of the case body 21. The bottom guard plate 22 may alternatively be disposed at a top of the case body 21 or on a side surface of the case body 21. The bottom guard plate 22 protects the case body 21, reducing impact of external debris on the case body 21 during vehicle operation, thereby improving the reliability of the battery cell assembly 10.

As an example, referring to FIGS. 2 to 4, the case assembly 20 includes a case body 21 and a bottom guard plate 22, where the case body 21 includes a first case portion 211 and a second case portion 212, the first accommodating cavity 23 is formed between the first case portion 211 and the second case portion 212, a second accommodating cavity 24 is formed between the bottom guard plate 22 and the second case portion 212, and the heat exchange assembly 30 is disposed within the second accommodating cavity 24.

Herein, the heat exchange assembly 30 being disposed within the second accommodating cavity 24 means that the heat exchange assembly 30 may be disposed only within the second accommodating cavity 24, or the heat exchange assembly 30 may be disposed within the second accommodating cavity 24 and other regions outside the second accommodating cavity 24.

The second accommodating cavity 24 is formed between the bottom guard plate 22 and the second case portion 212, meaning that the first accommodating cavity 23 is separated from the second accommodating cavity 24.

Herein, the bottom guard plate 22 is disposed, protecting the case assembly 20 and the battery cell 11 while providing support and protection for the heat exchange assembly 30.

The heat exchange assembly 30 is disposed within the second accommodating cavity 24, that is, the heat exchange assembly 30 is disposed outside the first accommodating cavity 23, to separate the heat exchange assembly 30 from the battery cell assembly 10. This prevents the heat exchange medium of the heat exchange assembly 30 from leaking and coming into contact with the battery cell assembly 10 to cause a short circuit of the battery apparatus 100, thereby improving the reliability of the battery apparatus 100.

In this embodiment, the bottom guard plate 22 is disposed outside the case body 21, so that the second accommodating cavity 24 is defined between the bottom guard plate 22 and the second case portion 212. The heat exchange assembly 30 is disposed within the second accommodating cavity 24 for heat exchange with the case body 21, thereby implementing heat exchange with the battery cell assembly 10 housed within the case body 21. In other words, the heat exchange assembly 30 is disposed outside the first accommodating cavity 23 of the case assembly 20, which can prevent short circuits of the battery apparatus 100 caused by leakage of the heat exchange medium from the heat exchange assembly 30 to some extent, improving the reliability of the battery apparatus 100. This can also increase the utilization rate of the internal accommodating cavity of the case assembly 20, thereby enhancing the compactness of the battery apparatus 100. Additionally, with arrangement of the bottom guard plate 22, the bottom guard plate 22 cooperates with the case body 21 to connect and protect the battery cell assembly 10, further improving the reliability of the case assembly 20.

In some embodiments, referring to FIGS. 2 to 7, part of the bottom guard plate 22 protrudes to form a connecting portion 221, and the connecting portion 221 is sealingly connected to the second case portion 212.

For example, an outermost periphery of the bottom guard plate 22 may protrude to form the connecting portion 221.

A specific manner for connecting the connecting portion 221 and the second case portion 212 is not limited herein. For example, the connecting portion 221 and the second case portion 212 are fastened by a bolt, a screw, a rivet, or the like.

In this embodiment, the connecting portion 221 is formed through protrusion, allowing the bottom guard plate 22 to be connected to the second case portion 212 while defining the second accommodating cavity 24 between the bottom guard plate 22 and the second case portion 212. Additionally, the connecting portion 221 is sealingly connected to the second case portion 212, which can prevent mud, water, or the like from entering the second accommodating cavity 24, thereby protecting the heat exchange assembly 30 within the second accommodating cavity 24.

In some embodiments, the case assembly 20 further includes a sealing member, where the sealing member is sealingly sandwiched between the connecting portion 221 and the second case portion 212 to implement a sealed connection between the connecting portion 221 and the second case portion 212.

For example, the sealing member is a sealing strip.

In this embodiment, the sealing member is disposed, and the sealing member is sealingly sandwiched between the connecting portion 221 and the second case portion 212, that is, the sealing member is configured to seal a gap between the connecting portion 221 and the second case portion 212, further preventing mud, water, or the like from entering the second accommodating cavity 24. This improves the sealing performance between the bottom guard plate 22 and the second case portion 212, and also reduces occurrence of liquid leakage from the heat exchange assembly 30.

In some embodiments, referring to FIGS. 4 to 7, part of the bottom guard plate 22 protrudes to form a limiting structure 222. The limiting structure 222 is configured to support the flexible member 31 and/or the second case portion 212.

The limiting structure 222 being configured to support the flexible member 31 and/or the second case portion 212 means that the limiting structure 222 abuts against the flexible member 31 and/or the second case portion 212, providing a certain supporting force to the flexible member 31 and/or the second case portion 212. In other words, the limiting structure 222 may be configured to support the flexible member 31, or may be configured to support the second case portion 212, or may be configured to support both the flexible member 31 and the second case portion 212.

It should be noted that part of the bottom guard plate 22 protruding to form the limiting structure 222 may mean: a side of the bottom guard plate 22 facing away from the case body 21 is recessed, causing a side of the bottom guard plate 22 facing the case body 21 to protrude to form the limiting structure 222; or a side of the bottom guard plate 22 facing away from the case body 21 is not recessed, and a side of the bottom guard plate 22 facing the case body 21 is thickened to protrude to form the limiting structure 222.

The limiting structure 222 is configured to support the flexible member 31 and/or the second case portion 212 to form a fixed space between the bottom guard plate 22 and the second case portion 212, improving the reliability of the battery apparatus 100.

In this embodiment, the bottom guard plate 22 is provided with the limiting structure 222 to support the flexible member 31 and/or the second case portion 212, mitigating deformation of the second case portion 212 caused by insufficient support strength under pressure, thereby preventing the second case portion 212 from coming into direct contact with the heat exchange assembly 30 and causing the heat exchange assembly 30 to collapse. This helps to improve stability of thermal interface contact of the heat exchange assembly 30, thereby enhancing the thermal management performance of the heat exchange assembly 30.

In some embodiments, the limiting structure 222 presses the flexible member 31 against the second case portion 212 to support the flexible member 31 and the second case portion 212.

For example, in an embodiment that the limiting structure 222 is configured to support the flexible member 31, the limiting structure 222 may support a surface of the flexible member 31 and press the flexible member 31 against the second case portion 212.

In this embodiment, the limiting structure 222 is disposed to press the flexible member 31 against the second case portion 212, supporting the second case portion 212 while fixing the heat exchange assembly 30, thereby improving the stability of the heat exchange assembly 30.

In some embodiments, referring to FIGS. 2 to 7, the heat exchange assembly 30 is provided with a clearance hole 33, and the limiting structure 222 runs through the clearance hole 33 to abut against the second case portion 212.

Herein, the heat exchange assembly 30 is provided with the clearance hole 33, that is, the flexible member 31 is provided with the clearance hole 33, and the clearance hole 33 extends through two opposite sides of the heat exchange assembly 30 in a thickness direction.

It should be noted that the clearance hole 33 needs to avoid the flow channel region 32.

Herein, a specific position and number of the clearance holes 33 are not limited herein and are determined based on specific circumstances.

For example, in an embodiment that the limiting structure 222 is configured to support the second case portion 212, the heat exchange assembly 30 may be provided with the clearance hole 33 to avoid the limiting structure 222, allowing the limiting structure 222 to run through the clearance hole 33 to abut against the second case portion 212.

In this embodiment, the heat exchange assembly 30 is provided with the clearance hole 33 to avoid the limiting structure 222, and the limiting structure 222 runs through the clearance hole 33 to abut against the second case portion 212, supporting the second case portion 212 while positioning the heat exchange assembly 30, thereby improving the stability of the heat exchange assembly 30.

In some embodiments, referring to FIGS. 2 to 7, a width of the heat-sealed zone 34 is 0.5 mm to 30 mm.

For example, the width is 0.5 mm, 1 mm, 1.5 mm, 2 mm, 3 mm, 4 mm, 5 mm, 8 mm, 10 mm, 12 mm, 13 mm, 15 mm, 18 mm, 20 mm, 21 mm, 23 mm, 24 mm, 25 mm, 26 mm, 27 mm, 28 mm, 29 mm, 30 mm, or the like.

It can be understood that an appropriate width is set for the heat-sealed zone 34, facilitating the sealing performance of the flow channel region 32, that is, ensuring the reliability of the flow channel region 32, while also mitigating an issue that excessively high temperature caused by an overly wide heat-sealed zone 34 affects hot pressing quality and damages the flexible member 31.

In this embodiment, the width of the heat-sealed zone 34 is set to be 0.5 mm to 30 mm, improving the reliability of the flow channel region 32 of the flexible member 31, and increasing the coverage rate of the flow channel region 32 is increased. This enhances the heat exchange efficiency of the heat exchange assembly 30, while also mitigating an issue that excessively high temperature caused by an overly wide heat-sealed zone 34 affects hot pressing quality and damages the flexible member 31.

In some embodiments, referring to FIGS. 2 to 7, the width of the heat-sealed zone 34 is 2 mm to 3 mm.

For example, the width is 2.0 mm, 2.1 mm, 2.3 mm, 2.4 mm, 2.5 mm, 2.6 mm, 2.7 mm, 2.8 mm, 2.9 mm, 3.0 mm, or the like.

In this embodiment, the width of the heat-sealed zone 34 is set to be 2 mm to 3 mm, further mitigating an issue that excessively high temperature caused by an overly wide heat-sealed zone 34 affects hot pressing quality and damages the flexible member 31.

Figure 8:
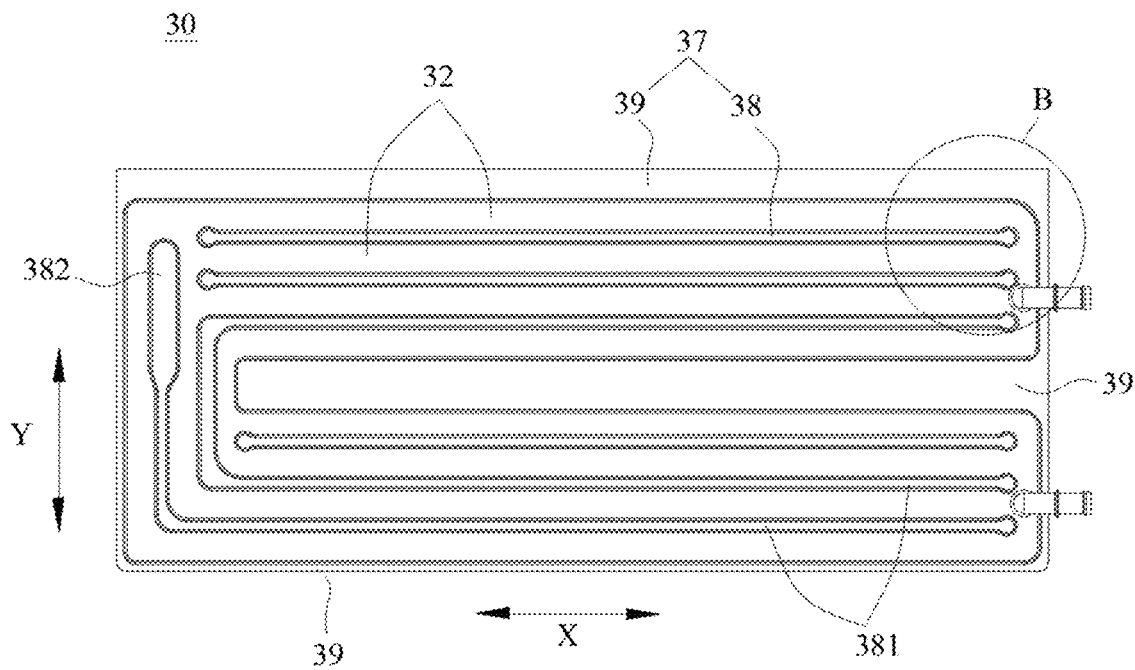
FIG. 8 is a schematic structural diagram of a heat exchange assembly according to another embodiment of the present disclosure.
Figure 9:
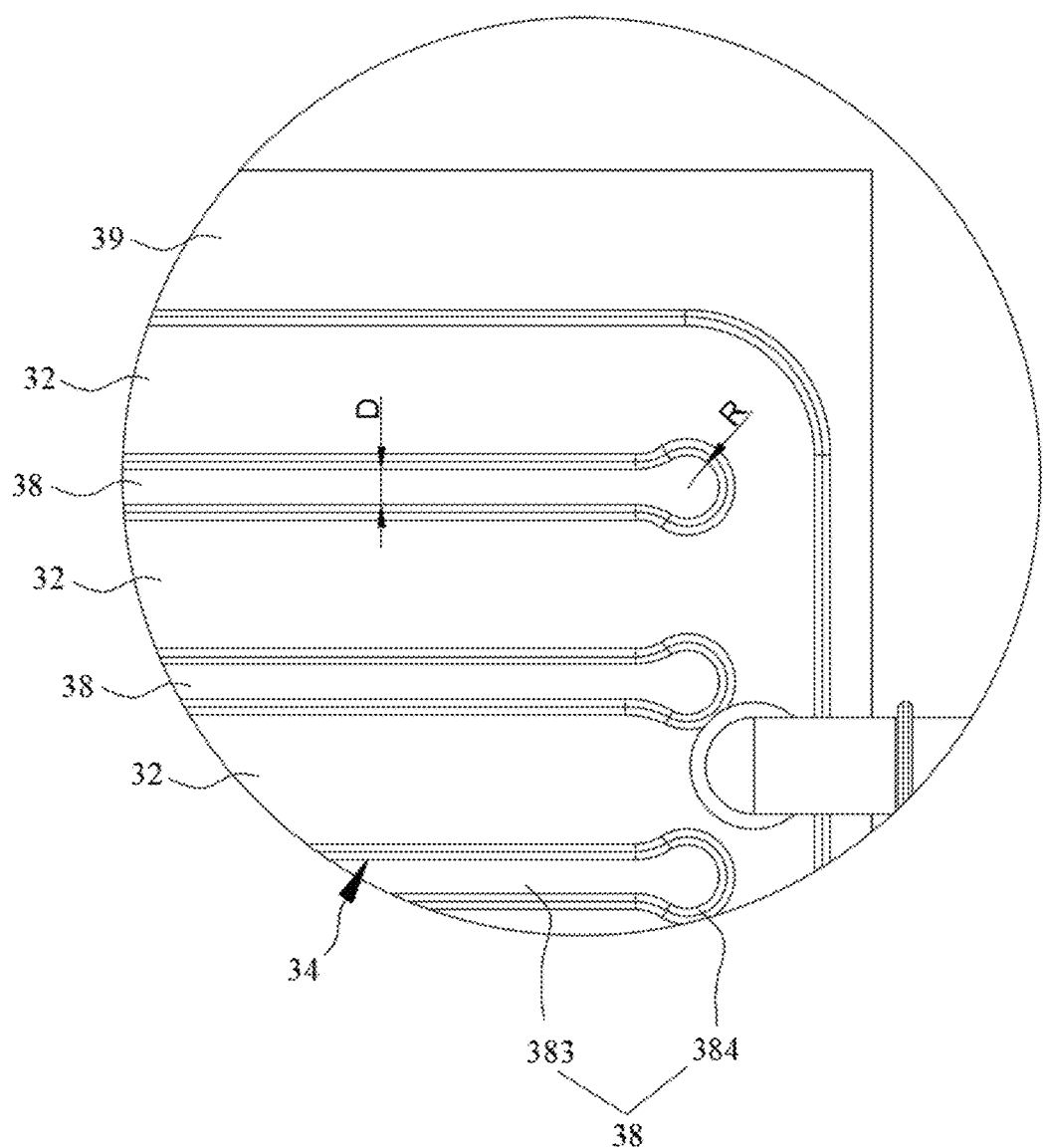
FIG. 9 is an enlarged view of position B in FIG. 8.

In some embodiments, referring to FIGS. 8 and 9, the flow channel region 32 surrounds an enclosed zone 38.

The enclosed zone 38 is formed by being surrounded by the flow channel region 32, that is, the enclosed zone 38 is located between the flow channel regions 32, and the heat-sealed zone 34 separates the enclosed zone 38 from the flow channel region 32.

For example, the non-heat-sealed zone 37 further includes an open zone 39, where the open zone 39 is located inside the flow channel region 32, one end of the open zone 39 is connected to the heat-sealed zone 34, and the other end extends to an edge of the flexible member 31, and the flow channel region 32 separates the enclosed zone 38 from the open zone 39.

It should be noted that the enclosed zone 38 is substantially in a closed state, but situations where the enclosed zone 38 communicates with the flow channel region 32 due to process issues are also within the protection scope of the present disclosure.

In related technologies, if the regions between adjacent flow channel regions are all formed as heat-sealed zones, the width of the heat-sealed zones is excessively large, leading to an issue that excessively high temperature caused by an overly wide heat-sealed zone affects hot pressing quality and damages the flexible members.

In this embodiment, the flow channel region 32 surrounds the enclosed zone 38, allowing for control of the width of the heat-sealed zone 34. In other words, arrangement of the enclosed zone 38 enhances the reliability of the heat-sealed zone 34 and mitigates an issue that excessively high temperature caused by an overly wide heat-sealed zone 34 affects hot pressing quality and damages the flexible member 31.

In some embodiments, referring to FIGS. 8 and 9, the enclosed zone 38 includes a first sub-region 381, the first sub-region 381 extends along a first direction, and a dimension of the first sub-region 381 in a second direction is D, where 1 mm≤D≤50 mm, and the first direction is perpendicular to the second direction.

D may be 1 mm, 2 mm, 3 mm, 4 mm, 5 mm, 6 mm, 7 mm, 8 mm, 9 mm, 10 mm, 11 mm, 12 mm, 13 mm, 15 mm, 18 mm, 20 mm, 30 mm, 40 mm, or 50 mm, or any value between any two of these values.

For example, the case assembly 20 is typically a cuboidal structure, where a length direction and a width direction of the case assembly 20 are both parallel to a horizontal plane, the length direction of the case assembly 20 is parallel to a longest edge of the cuboidal structure of the case assembly 20, and a height direction of the case assembly 20 is perpendicular to the ground. For example, as shown in FIGS. 2, 3, and 8, the length direction of the case assembly 20 is denoted as X, the width direction of the case assembly 20 is denoted as Y, and the height direction of the case assembly 20 is denoted as Z.

For example, the first direction may be the length direction of the case assembly 20, and the second direction may be the width direction of the case assembly 20.

When D≥1 mm, adjacent heat-sealed zones 34 can be separated, preventing overlapping of heat-sealed zones 34 which would otherwise result in a large hot pressing width of the zones, thereby addressing an issue that excessively high temperature caused by an overly wide heat-sealed zone 34 affects hot pressing quality and damages the flexible member 31. When D≤50 mm, the spacing between adjacent flow channel regions 32 can be controlled, thereby improving heat exchange efficiency and heat exchange effect. Therefore, when 1 mm≤D≤50 mm, an optimal balance between hot pressing quality and heat exchange efficiency can be achieved, making the heat exchange assembly 30 more practical.

In some embodiments, referring to FIGS. 8 and 9, the non-heat-sealed zone 37 further includes a second sub-region 382, the second sub-region 382 extends along the second direction, and a dimension of the second sub-region 382 in the first direction is D, where 1 mm≤D≤50 mm.

D may be 1 mm, 2 mm, 3 mm, 4 mm, 5 mm, 6 mm, 7 mm, 8 mm, 9 mm, 10 mm, 11 mm, 12 mm, 13 mm, 15 mm, 18 mm, 20 mm, 30 mm, 40 mm, or 50 mm, or any value between any two of these values.

Herein, the first direction may be the length direction of the case assembly 20, and the second direction may be the width direction of the case assembly 20.

When D≥1 mm, adjacent heat-sealed zones 34 can be separated, preventing overlapping of heat-sealed zones 34 which would otherwise result in a large hot pressing width of the zones, thereby addressing an issue that excessively high temperature caused by an overly wide heat-sealed zone 34 affects hot pressing quality and damages the flexible member 31. When D≤50 mm, the spacing between adjacent flow channel regions 32 can be controlled, thereby improving heat exchange efficiency and heat exchange effect. Therefore, when 1 mm≤D≤50 mm, an optimal balance between hot pressing quality and heat exchange efficiency can be achieved, making the heat exchange assembly 30 more practical.

In some embodiments, referring to FIGS. 8 and 9, at least part of the enclosed zone 38 is provided with an arc-shaped region 384 at an end along an extension direction.

Herein, it may be that part of the enclosed zones 38 is provided with the arc-shaped region 384 at an end along the extension direction, or all of the enclosed zone 38 is provided with the arc-shaped region 384 at an end along the extension direction.

Herein, it may be that the arc-shaped region 384 may be provided at one end of the enclosed zone 38 along the extension direction, or the arc-shaped region 384 is provided at two ends of the enclosed zone 38 along the extension direction.

An arc is a shape that is part of a circle or an ellipse. Any deviation or curvature from a straight line or a horizontal line is present as the shape of a circular arc or an elliptical arc.

Certainly, the flow channel region 32 may alternatively transition via an arc at a corner.

In this embodiment, the arc-shaped region 384 is disposed at the end of the enclosed zone 38 along the extension direction. This mitigates overlapping of heat-sealed zones 34 at the end of the enclosed zone 38. This can also prevent stress concentration caused by existence of right angles at the end of the enclosed zone 38, thereby mitigating failure of the heat-sealed zone 34 caused by stress concentration and improving hot pressing quality.

In some embodiments, referring still to FIGS. 8 and 9, a radius of the arc-shaped region 384 is R, where 4 mm≤R≤30 mm.

R may be 4 mm, 4.5 mm, 5 mm, 5.5 mm, 6 mm, 6.5 mm, 7 mm, 7.5 mm, 8 mm, 10 mm, 15 mm, 18 mm, 20 mm, or 30 mm, or any value between any two of these values.

When R≥4 mm, adjacent heat-sealed zones 34 can be separated, preventing overlapping of heat-sealed zones 34 which would otherwise result in a large hot pressing width of the zones, thereby addressing an issue that excessively high temperature caused by an overly wide heat-sealed zone 34 affects hot pressing quality and damages the flexible member 31. This can also prevent stress concentration caused by existence of right angles at the end of the enclosed zone 38, thereby mitigating failure of the heat-sealed zone 34 caused by stress concentration and improving hot pressing quality. When R≤30 mm, the spacing between adjacent flow channel regions 32 can be controlled, thereby improving heat exchange efficiency and heat exchange effect. Therefore, when 4 mm≤R≤30 mm, an optimal balance between hot pressing quality and heat exchange efficiency can be achieved, making the heat exchange assembly 30 more practical.

In some embodiments, 8 mm≤R≤20 mm.

R may be 8 mm, 8.5 mm, 9 mm, 9.5 mm, 10 mm, 10.5 mm, 11 mm, 11.5 mm, 12 mm, 12.5 mm, 13 mm, 13.5 mm, 14 mm, 14.5 mm, 15 mm, 16 mm, 17 mm, 18 mm, 19 mm, or 20 mm, or any value between any two of these values.

When 8 mm≤R≤20 mm, hot pressing quality and heat exchange efficiency are further improved, making the heat exchange assembly 30 more practical.

In some embodiments, referring to FIGS. 8 and 9, the enclosed zone 38 includes a main body region 383 and an arc-shaped region 384. The main body region 383 extends along the first direction, at least one end of the main body region 383 along the first direction is provided with the arc-shaped region 384, a dimension of the main body region 383 in the second direction is D, and a radius of the arc-shaped region 384 is R, where R≥D/2, and the first direction is perpendicular to the second direction.

In other words, a diameter of the arc-shaped region 384 is set to be greater than a dimension of the main body region 383 in a direction perpendicular to the extension direction.

In this embodiment, when R≥D/2, adjacent heat-sealed zones 34 can be separated, preventing overlapping of heat-sealed zones 34 which would otherwise result in a large hot pressing width of the zones, thereby addressing an issue that excessively high temperature caused by an overly wide heat-sealed zone 34 affects hot pressing quality and damages the flexible member 31. This can also prevent stress concentration caused by existence of right angles at the end of the enclosed zone 38, thereby mitigating failure of the heat-sealed zone 34 caused by stress concentration and improving hot pressing quality.

In some embodiments, referring to FIGS. 8 and 9, the main body region 383 is smoothly connected to the arc-shaped region 384.

The main body region 383 being smoothly connected to the arc-shaped region 384 means that there is a smooth transition via an arc between the main body region 383 and the arc-shaped region 384, further mitigating failure of the heat-sealed zone 34 caused by stress concentration and further improving hot pressing quality.

In some embodiments, referring to FIGS. 8 and 9, a central angle corresponding to the arc-shaped region 384 is greater than or equal to 180°.

The central angle corresponding to the arc-shaped region 384 being greater than or equal to 180° means that a region corresponding to the arc-shaped region 384 is greater than or equal to a semicircle, further mitigating the issue of stress concentration.

In some embodiments, the at least two flexible members 31 are arranged as metal-plastic composite films.

The flexible member 31 is a single-layer or multi-layer film.

The metal-plastic composite film is a metal-plastic composite material, that is, including a metal layer and a plastic layer.

In this embodiment, since the metal-plastic composite films have small thickness and light weight, and the flow channel region 32 is formed between at least two metal-plastic composite films, the heat exchange assembly 30 is not affected by the extrusion process and does not require a large thickness, thereby reducing the overall thickness and weight of the heat exchange assembly 30. Additionally, the insulating properties of the metal-plastic composite film can reduce the risk of insulation failure, reduce the risk of the heat exchange assembly 30 reacting with the heat exchange medium flowing inside, and further reduce the risk of corrosion and leakage.

For example, the at least two flexible members 31 are arranged as aluminum-plastic films.

The aluminum-plastic film has high barrier performance, as well as good cold stamping formability, puncture resistance, electrolyte stability, and electrical insulation.

In some embodiments, the flexible member 31 is a layered structure, the flexible member 31 includes a metal layer and a non-metal layer, and the metal layer and the non-metal layer are sequentially stacked.

Herein, the flexible member 31 includes the metal layer and the non-metal layer, that is, a composite material member composed of the metal layer and the non-metal layer.

For example, the metal layer and the non-metal layer may be formed by hot pressing or hot melting.

Herein, the numbers of metal layers and non-metal layers are not limited.

In this embodiment, the flexible members 31 with the sequentially stacked metal layer and non-metal layer have small thickness and light weight, and the flow channel region 32 is formed between the at least two flexible members 31, so that the heat exchange assembly 30 is not affected by the extrusion process and does not require a large thickness, thereby reducing the overall thickness and weight of the heat exchange assembly 30. Additionally, the heat exchange assembly 30 does not react with the heat exchange medium flowing inside, so there is no risk of corrosion and leakage.

In some embodiments, the metal layer includes one or more of aluminum foil, copper foil, and steel foil.

The metal layer is designed to include one or more of aluminum foil, copper foil, and steel foil, allowing the flexible member 31 to have sufficient structural strength and provide isolation.

In some embodiments, the non-metal layer includes one or more of polypropylene, polyvinyl chloride, and polyethylene.

The non-metal layer is designed to include one or more of polypropylene, polyvinyl chloride, and polyethylene, allowing the flexible member 31 to have a waterproof effect.

For example, a non-metal layer made of a corrosion-resistant material with acid and alkali resistance may also be selected, or an additive may be added to the non-metal layer to provide acid and alkali resistance for the non-metal layer.

In some embodiments, the non-metal layer is a hot-melt layer.

Herein, the non-metal layer is arranged as a hot-melt layer, that is, made of a hot-melt material, facilitating composite formation of the non-metal layer and the metal layer through hot melting, resulting in simple forming and high production efficiency.

In some embodiments, the flexible member 31 is a layered structure, the flexible member 31 includes a corrosion-resistant layer, an isolation layer, and a waterproof layer arranged sequentially, and the waterproof layer is closer to the flow channel region 32 than the corrosion-resistant layer.

Herein, the corrosion-resistant layer may be a nylon layer made of a nylon material, providing certain corrosion resistance performance, such as resistance to acid and alkali corrosion.

The isolation layer may be a metal layer, and the metal layer may be designed to include one or more of aluminum foil, copper foil, and steel foil, allowing the flexible member 31 to have sufficient structural strength and provide isolation.

The waterproof layer may be a non-metal layer, and the non-metal layer may be designed to include one or more of polypropylene, polyvinyl chloride, and polyethylene, allowing the flexible member 31 to have a waterproof effect.

In this embodiment, the flexible member 31 is designed to include the corrosion-resistant layer, the isolation layer, and the waterproof layer sequentially, with the waterproof layer closer to the flow channel region 32 than the corrosion-resistant layer, thereby improving the reliability of the heat exchange assembly 30.

In some embodiments, a thickness of the isolation layer is 6.5 μm to 100 μm.

The thickness of the isolation layer may be 6.5 μm, 10 μm, 15 μm, 20 μm, 25 μm, 30 μm, 35 μm, 38 μm, 40 μm, 45 μm, 50 μm, 55 μm, 60 μm, 65 μm, 70 μm, 75 μm, 80 μm, 85 μm, 90 μm, 92 μm, 95 μm, or 100 μm, or any value between any two of these values.

In this embodiment, the thickness of the isolation layer is set to be 6.5 μm to 100 μm, allowing the flexible member 31 to have sufficient structural strength and flexibility.

In some embodiments, the thickness of the isolation layer is 6.5 μm to 15 μm.

The thickness of the isolation layer may be 6.5 μm, 7 μm, 7.5 μm, 7.8 μm, 8 μm, 8.3 μm, 8.5 μm, 8.8 μm, 9 μm, 9.2 μm, 9.5 μm, 9.7 μm, 10 μm, 10.3 μm, 10.5 μm, 10.8 μm, 11 μm, 11.5 μm, 11.8 μm, 12 μm, 12.3 μm, 12.5 μm, 13 μm, 13.5 μm, 14 μm, 14.5 μm, or 15 μm, or any value between any two of these values.

In this embodiment, the thickness of the isolation layer is set to be 6.5 μm to 15 μm, further allowing the flexible member 31 to have sufficient structural strength and flexibility.

In some embodiments, a thickness of the corrosion-resistant layer is 5 μm to 20 μm.

The thickness of the corrosion-resistant layer may be 5 μm, 5.5 μm, 5.8 μm, 6 μm, 6.5 μm, 7 μm, 7.5 μm, 7.8 μm, 8 μm, 8.3 μm, 8.5 μm, 8.8 μm, 9 μm, 9.2 μm, 9.5 μm, 9.7 μm, 10 μm, 10.3 μm, 10.5 μm, 10.8 μm, 11 μm, 11.5 μm, 11.8 μm, 12 μm, 12.3 μm, 12.5 μm, 13 μm, 13.5 μm, 14 μm, 14.5 μm, 15 μm, 15.5 μm, 16 μm, 16.5 μm, 17 μm, 17.5 μm, 18 μm, 18.5 μm, 18.7 μm, 19 μm, 19.5 μm, or 20 μm, or any value between any two of these values.

In this embodiment, the thickness of the corrosion-resistant layer is set to be 5 μm to 20 μm, improving the wear resistance and toughness of the flexible member 31.

In some embodiments, a thickness of the waterproof layer is 50 μm to 120 μm.

The thickness of the waterproof layer may be 50 μm, 55 μm, 60 μm, 65 μm, 70 μm, 75 μm, 80 μm, 85 μm, 90 μm, 92 μm, 95 μm, 100 μm, 105 μm, 108 μm, 110 μm, 115 μm, or 120 μm, or any value between any two of these values.

In this embodiment, the thickness of the waterproof layer is set to be 50 μm to 120 μm, allowing sufficient structural strength for the waterproof layer to improve waterproof performance, and facilitating hot-pressing connection of the flexible member 31 through the waterproof layer.

In some embodiments, a thickness of the flexible member 31 is 0.05 mm to 0.3 mm.

For example, the thickness may be 0.05 mm, 0.06 mm, 0.07 mm, 0.08 mm, 0.09 mm, 0.1 mm, 0.15 mm, 0.2 mm, 0.21 mm, 0.22 mm, 0.25 mm, 0.27 mm, 0.28 mm, 0.3 mm, or the like.

In this embodiment, the thickness of the flexible member 31 is set to be 0.05 mm to 0.3 mm, allowing sufficient structural strength for the heat exchange assembly 30 made of the flexible member 31 while maintaining a small overall thickness for the heat exchange assembly 30. This helps to reduce the overall volume and weight of the battery apparatus 100, thereby increasing the energy density of the battery apparatus 100.

In some embodiments, the thickness of the flexible member 31 is 0.08 mm to 0.2 mm.

For example, the thickness is 0.08 mm, 0.09 mm, 0.1 mm, 0.11 mm, 0.12 mm, 0.13 mm, 0.14 mm, 0.15 mm, 0.16 mm, 0.17 mm, 0.18 mm, 0.19 mm, 0.2 mm, or the like.

In this embodiment, the thickness of the flexible member 31 is set to be 0.08 mm to 0.2 mm, allowing sufficient structural strength for the heat exchange assembly 30 made of the flexible member 31 while further maintaining a small overall thickness for the heat exchange assembly 30. This helps to further reduce the overall volume and weight of the battery apparatus 100, thereby further increasing the energy density of the battery apparatus 100.

In some embodiments, an elastic modulus of the flexible member 31 is 0.1 MPa to 10000 MPa.

For example, the elastic modulus of the flexible member 31 may be 0.1 MPa, 1 MPa, 50 MPa, 100 MPa, 150 MPa, 200 MPa, 300 MPa, 500 MPa, 800 MPa, 1000 MPa, 1300 MPa, 1500 MPa, 1800 MPa, 2000 MPa, 2500 MPa, 2800 MPa, 3000 MPa, 3500 MPa, 4000 MPa, 4500 MPa, 5000 MPa, 5500 MPa, 6000 MPa, 6500 MPa, 7000 MPa, 7500 MPa, 8000 MPa, 8500 MPa, 8800 MPa, 9000 MPa, 9500 MPa, 9700 MPa, or 10000 MPa, or any value between any two of these values.

The elastic modulus describes unit strain caused by unit stress when a solid is subjected to force within a specific range, and it is one of the fundamental physical quantities of a material. A larger elastic modulus indicates a greater stiffness and a stronger compressive strength of a material. The elastic modulus is a physical quantity describing the elasticity of a material.

In this embodiment, the elastic modulus of the flexible member 31 is set to be 0.1 MPa to 10000 MPa, allowing sufficient structural strength for the flexible member 31 to improve the reliability of the heat exchange assembly 30, as well as sufficient deformation capability to enhance the fit between the heat exchange assembly 30 and the case assembly 20 and/or the battery cell assembly 10. This increases the effective heat exchange area between the heat exchange assembly 30 and the case assembly 20 and/or the battery cell assembly 10, thereby improving the heat exchange efficiency and effect of the heat exchange assembly 30.

In a specific embodiment, referring to FIGS. 2 to 4, a battery apparatus includes a case assembly 20, a battery cell assembly 10, and a heat exchange assembly 30. The case assembly 20 has a first accommodating cavity 23 therein. The battery cell assembly 10 is disposed within the first accommodating cavity 23. The heat exchange assembly 30 is disposed within the case assembly 20. The heat exchange assembly 30 includes at least two flexible members 31. Referring to FIG. 3, the at least two flexible members 31 are stacked, and at least one flow channel region 32 is formed between the flexible members 31, where the at least one flow channel region 32 is configured to circulate a heat exchange medium, and the heat exchange medium is configured to exchange heat with the battery cell assembly 10. The case assembly 20 includes a case body 21 and a bottom guard plate 22. The case body 21 includes a first case portion 211 and a second case portion 212, the first case portion 211 and the second case portion 212 are engaged with each other, and the first case portion 211 and the second case portion 212 together define the first accommodating cavity 23 for accommodating the battery cell assembly 10. A second accommodating cavity 24 is formed between the bottom guard plate 22 and an outer side wall of the case body 21. The heat exchange assembly 30 is disposed within the second accommodating cavity 24. Part of the bottom guard plate 22 protrudes to form a connecting portion 221, and the connecting portion 221 is sealingly connected to the second case portion 212. Part of the bottom guard plate 22 protrudes to form a limiting structure 222, the heat exchange assembly 30 is provided with a clearance hole 33, and the limiting structure 222 runs through the clearance hole 33 to support the second case portion 212. The limiting structure 222 is disposed in a central region of the second accommodating cavity 24. The at least two flexible members 31 are arranged as aluminum-plastic films. The at least two flexible members 31 include a heat-sealed zone 34. The heat-sealed zone 34 is formed by hot pressing the at least two flexible members 31. The heat-sealed zone 34 divides the heat exchange assembly 30 to form at least one flow channel region 32.

In a specific embodiment, the flexible member 31 is a layered structure, the flexible member 31 includes a corrosion-resistant layer, an isolation layer, and a waterproof layer arranged sequentially, and the waterproof layer is closer to the flow channel region 32 than the corrosion-resistant layer. A thickness of the isolation layer is 6.5 µm to 15 µm. A thickness of the corrosion-resistant layer is 5 µm to 20 µm. A thickness of the waterproof layer is 50 µm to 120 µm. A thickness of the flexible member 31 is 0.05 mm to 0.3 mm. An elastic modulus of the flexible member 31 is 0.1 MPa to 10000 MPa.

It should be noted that, the width of the heat-sealed zone 34 can be measured using a vernier caliper before the heat exchange assembly is assembled to the case assembly, the dimension of the first sub-region 381 in the second direction can be measured using a vernier caliper before the heat exchange assembly is assembled to the case assembly, and the radius of the arc-shaped region 384 can be measured using a gauge before the heat exchange assembly is assembled to the case assembly; the thicknesses of the corrosion-resistant layer, the isolation layer, and the waterproof layer can be measured using a vernier caliper; and the thickness of the flexible member 31 can be measured using a vernier caliper before the heat exchange assembly is assembled to the case assembly. It should be noted that the above measurements can all be performed under normal temperature and pressure.

A method for measuring the elastic modulus of the flexible member 31 may include at least one of a static tensile test method, a dynamic test method, a sound velocity method, a nanoindentation method, and a bending method. Measurement instruments may include a nanoindenter and a universal testing machine.

For example, the elastic modulus of the flexible member 31 can be measured under normal temperature and pressure using the nanoindentation method. In the nanoindentation method, a micro-indenter is used to indent a surface of the flexible member 31, and the elastic modulus is calculated by analyzing a relationship between indentation depths and loads.

In the description of the present disclosure, references to terms such as "in one embodiment", "in some embodiments", "in other embodiments", "in yet other embodiments", or "exemplary" indicate that specific features, structures, materials, or characteristics described in connection with the embodiment or example are included in at least one embodiment or example of the present disclosure. In the present disclosure, schematic expressions of the above terms do not necessarily refer to the same embodiment or example. Moreover, the specific features, structures, materials, or characteristics described may be combined in any suitable manner in any one or more embodiments or examples. Additionally, in the absence of mutual contradiction, those skilled in the art may combine different embodiments or examples described in the present disclosure and features of different embodiments or examples.

The above descriptions are merely preferred embodiments of the present disclosure and are not intended to limit the present disclosure. For those skilled in the art, the present disclosure may have various modifications and changes. Any modifications, equivalent replacements, improvements, and the like made within the spirit and principles of the present disclosure are included within the protection scope of the present disclosure.

What is claimed is:

1. A battery apparatus, comprising:
a case assembly;
a battery cell assembly disposed within the case assembly; and
a heat exchange assembly disposed within the case assembly; wherein the heat exchange assembly comprises at least two flexible members, the at least two flexible members are stacked, and the at least two flexible members form a hot-pressed region and a flow channel region by hot pressing;
wherein the flow channel region is configured to circulate a heat exchange medium to exchange heat with the battery cell assembly; and the hot-pressed region comprises a heat-sealed zone, and the at least two flexible members are interconnected within the heat-sealed zone,
wherein the hot-pressed region further comprises a non-heat-sealed zone, and the non-heat-sealed zone and the heat exchange flow channel are respectively located on two sides of the heat-sealed zone, the non-heat-sealed zone comprises an enclosed zone, and the flow channel region surrounds the enclosed zone.

2. The battery apparatus according to claim 1, wherein a width of the heat-sealed zone is 0.5 mm to 30 mm.

3. The battery apparatus according to claim 2, wherein the width of the heat-sealed zone is 2 mm to 3 mm.

4. The battery apparatus according to claim 1, wherein the enclosed zone comprises a first sub-region, the first sub-region extends along a first direction, and a dimension of the first sub-region in a second direction is D, wherein 1 mm≤D≤50 mm, and the first direction is perpendicular to the second direction.

5. The battery apparatus according to claim 4, wherein the non-heat-sealed zone further comprises a second sub-region, the second sub-region extends along the second direction, and a dimension of the second sub-region in the first direction is D, wherein 1 mm≤D≤50 mm.

6. The battery apparatus according to claim 1, wherein at least part of the enclosed zone is provided with an arc-shaped region at an end along an extension direction.

7. The battery apparatus according to claim 6, wherein a radius of the arc-shaped region is R, wherein 4 mm≤R≤30 mm.

8. The battery apparatus according to claim 7, wherein 8 mm≤R≤20 mm.

9. The battery apparatus according to claim 6, wherein the enclosed zone further comprises a main body region, the main body region extends along the first direction, the arc-shaped region is provided on at least one end of the main body region along the first direction, a dimension of the main body region in the second direction is D, and a radius of the arc-shaped region is R, wherein R≥D/2, and the first direction is perpendicular to the second direction.

10. The battery apparatus according to claim 9, wherein the main body region is smoothly connected to the arc-shaped region.

11. The battery apparatus according to claim 6, wherein a central angle corresponding to the arc-shaped region is greater than or equal to 180°.

12. The battery apparatus according to claim 1, wherein the at least two flexible members are arranged as metal-plastic composite films, wherein the at least two flexible members are arranged as aluminum-plastic films.

13. The battery apparatus according to claim 1, wherein the flexible member is a layered structure, the flexible member comprises a metal layer and a non-metal layer, and the metal layer and the non-metal layer are sequentially stacked, wherein the metal layer comprises one or more of aluminum foil, copper foil, and steel foil, the non-metal layer comprises one or more of polypropylene, polyvinyl chloride, and polyethylene, and/or the non-metal layer is a hot-melt layer.

14. The battery apparatus according to claim 1, wherein the flexible member is a layered structure, the flexible member comprises a corrosion-resistant layer, an isolation layer, and a waterproof layer arranged sequentially, and the waterproof layer is closer to the flow channel region than the corrosion-resistant layer, wherein a thickness of the isolation layer is 6.5 μm to 100 μm wherein, a thickness of the corrosion-resistant layer is 5 μm to 20 μm, and/or a thickness of the waterproof layer is 50 μm to 120 μm.

15. The battery apparatus according to claim 1, wherein a thickness of the flexible member is 0.05 mm to 0.3 mm, wherein the thickness of the flexible member is 0.08 mm to 0.2 mm.

16. The battery apparatus according to claim 1, wherein an elastic modulus of the flexible member is 0.1 MPa to 10000 MPa.

17. A heat exchange assembly, wherein the heat exchange assembly is a heat exchange assembly of the battery apparatus according to claim 1, and the heat exchange assembly is configured to exchange heat with the battery cell assembly.

18. An electric device, comprising the battery apparatus according to claim 1 or the heat exchange assembly according to claim 17.

* * * * *